(12) United States Patent
Lee et al.

(10) Patent No.: US 11,843,697 B2
(45) Date of Patent: Dec. 12, 2023

(54) COMMUNICATION DEVICE AND METHOD USING MESSAGE HISTORY-BASED SECURITY KEY BY MEANS OF BLOCKCHAIN

(71) Applicant: SOGANG UNIVERSITY RESEARCH FOUNDATION, Seoul (KR)

(72) Inventors: Jun Ha Lee, Seoul (KR); Soo Yong Park, Seoul (KR); Ji Woo Park, Seoul (KR); Jin Hwan Lee, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 653 days.

(21) Appl. No.: 16/649,840

(22) PCT Filed: Nov. 17, 2017

(86) PCT No.: PCT/KR2017/013120
§ 371 (c)(1),
(2) Date: Jul. 23, 2020

(87) PCT Pub. No.: WO2019/059453
PCT Pub. Date: Mar. 28, 2019

(65) Prior Publication Data
US 2020/0366479 A1 Nov. 19, 2020

(30) Foreign Application Priority Data
Sep. 22, 2017 (KR) .................... 10-2017-0122210

(51) Int. Cl.
*H04L 9/08* (2006.01)
*H04L 12/40* (2006.01)
*H04L 9/00* (2022.01)
*H04L 9/06* (2006.01)

(52) U.S. Cl.
CPC .......... *H04L 9/0891* (2013.01); *H04L 9/0643* (2013.01); *H04L 9/0861* (2013.01); *H04L 12/40* (2013.01); *H04L 9/50* (2022.05)

(58) Field of Classification Search
CPC ... H04L 9/0891; H04L 9/0643; H04L 9/0861; H04L 12/40; H04L 9/50; H04L 63/068;
(Continued)

(56) References Cited

U.S. PATENT DOCUMENTS 7,457,411 B2 * 11/2008 Soliman ................ H04L 9/0822
380/47
8,719,571 B2 * 5/2014 Clay ...................... H04L 63/104
726/8
(Continued)

FOREIGN PATENT DOCUMENTS

KR 10-2015-0024117 3/2015
KR 10-1608815 4/2016
(Continued)

OTHER PUBLICATIONS

Kleberger et al., "Security Aspects of the In-Vehicle Network in the Connected Car", IEEE Intelligent Vehicles Symposium (IV). Jun. 5-9, 2011, pp. 528-533.

*Primary Examiner* — Mohammed Waliullah
(74) *Attorney, Agent, or Firm* — DUANE MORRIS LLP; Gregory M. Lefkowitz; Randall C. Pyles

(57) ABSTRACT

The present disclosure relates to technology that performs encrypted communication via a network or a bus, and a communication method using a security key between nodes connected via a network or a bus includes setting a critical cluster among multiple nodes, selecting a primary message shared between the set critical clusters, and encrypting a message using a key generated to be valid for a preset period to enable communication between the critical clusters, wherein each of the critical clusters stores the primary
(Continued)

message for the preset period according to a same key generation scheme to generate a block, and generates and possesses a new key based on the generated block and a currently used key, so that information about a previous message and a previous key is sequentially accumulated in the new key.

20 Claims, 11 Drawing Sheets

(58) Field of Classification Search
CPC .......... H04L 2209/805; H04L 2209/84; H04L 9/088; H04L 9/0894; H04L 9/0816; H04L 12/40104; H04L 2209/12
See application file for complete search history.

(56) References Cited

U.S. PATENT DOCUMENTS

| | | | |
|---|---|---|---|
| 9,705,678 B1* | 7/2017 | Wang | G06F 21/602 |
| 2004/0006546 A1* | 1/2004 | Wedlake | G06Q 10/04 |
| | | | 709/224 |
| 2005/0021574 A1* | 1/2005 | Miller | G06F 11/2046 |
| | | | 714/E11.073 |
| 2012/0254607 A1* | 10/2012 | Chittigala | H04L 63/0428 |
| | | | 713/150 |

FOREIGN PATENT DOCUMENTS

| | | |
|---|---|---|
| KR | 10-1678795 | 11/2016 |
| WO | 2017145008 | 8/2017 |

* cited by examiner

COMMUNICATION DEVICE AND METHOD USING MESSAGE HISTORY-BASED SECURITY KEY BY MEANS OF BLOCKCHAIN

CROSS-REFERENCE TO RELATED APPLICATIONS

This application is a § 371 national stage entry of International Application No. PCT/KR2017/013120, filed on Nov. 17, 2017, which claims priority to Korean Patent Application No. 10-2017-0122210, filed on Sep. 22, 2017, the entire contents of which are incorporated herein by reference.

TECHNICAL FIELD

The present disclosure relates to technology that performs encrypted communication via a network or a bus, and more particularly, to a node that generates an encryption key for ensuring secure communication between nodes constituting a network within system or between a node on a network within system and an external node that interacts with the node and transmits and receives the encryption key, a method for communication between nodes and a recording medium having the method recorded thereon.

BACKGROUND ART

A control based system, for example, a vehicle and a drone, is a distributed system in which small computers communicate with one other. Recently, with the increasing number and complexity of functions of the control based system, for example, vehicles and drones, a network of the system is in the form of a bus that is easy to transmit data.

However, it is impossible to know who sent data according to the characteristics of the network in the form of a bus, so all nodes process a message regardless of whether the message is authentic or not, when the message is transmitted. For this reason, when the bus is hacked and an unauthorized node accesses the bus and sends a message, the nodes execute a command given by the unauthorized node, causing a malfunction, which threatens human life. Particularly, in these emerging automated driving systems or drones, nodes, not humans, control all situations and drive vehicles, and thus when security threats occur, the problem may be more serious.

The network of the system has been isolated from the outside world until now, and the risk of security threats was low, but with the recent technology development of Internet of Things (IoT) and automated driving systems, the system network is exposed to the outside world, and thus greater emphasis is placed on the need for security. Accordingly, there is a need for technology to identify a message sent by an unauthorized node accessing the network of the system.

RELATED LITERATURES

Non-Patent Literature (Non-Patent Literature 1) Kleberger, Pierre, Tomas Olovsson, and Erland Jonsson. "Security aspects of the in-vehicle network in the connected car." Intelligent Vehicles Symposium (IV), 2011 IEEE. IEEE, 2011.

DISCLOSURE

Technical Problem

The present disclosure is aimed at overcoming the limitations of the existing fixed symmetric key technology applied to a network within a system associated with the exposure of a key posing a serious threat to security or being vulnerable to replay attacks in which a message is intercepted in the network, and the problems of the existing dynamic key technology associated with the exposure of a key or a seed value for key generation to the network, being vulnerable to spoofing attacks and low network speed or overheads.

Technical Solution

To solve the above-described technical problem, a communication method using a security key between nodes connected via a network or a bus according to an embodiment of the present disclosure includes (a) setting a critical cluster among multiple nodes, (b) selecting a primary message shared between the set critical clusters, and (c) encrypting a message using a key generated to be valid for a preset period to enable communication between the critical clusters, wherein each of the critical clusters stores the primary message for the preset period according to a same key generation scheme to generate a block, and generates and possesses a new key based on the generated block and a currently used key, so that information about a previous message and a previous key is sequentially accumulated in the new key.

In the communication method using a security key according to an embodiment, the step (a) may include setting a node related to a preset security function among the multiple nodes as the critical cluster, setting a node located within a system among the multiple nodes as the critical cluster, or setting a node located within a system and a node that interacts with the node as the critical cluster.

In the communication method using a security key according to an embodiment, the step (b) may include selecting, as the primary message, a message transmitted and received to/from a largest number of critical clusters among a set of messages transmitted and received between the set critical clusters. Additionally, the step (b) may further include sending the primary message to a node that does not share the primary message among the critical clusters, if any.

In the communication method using a security key according to an embodiment, the step (c) may include generating a message to send or verifying a received message using an encrypted message of a previous period stored in each of the critical clusters and a key pre-stored to be valid for a current period.

In the communication method using a security key according to an embodiment, the step (c) may include (c2) encrypting a message to send and an encrypted message of a previous period using a key pre-stored to be valid for a current period to generate a new encrypted message, and (c3) attaching the generated new encrypted message to the message to send and sending to a receiver node. Additionally, the step (c) may further include (c4) encrypting the message received by the receiver node and the stored encrypted message of the previous period using the stored key valid for the current period, and comparing with the received new encrypted message to verify security. Further, the step (c) may further include (c1) reading an initial key and an encrypted message pre-stored at an initial wakeup time of the critical clusters or a key and an encrypted message stored last at a previous termination time to verify match between the critical clusters.

The communication method using a security key according to an embodiment may further include (d) generating and possessing, by each of the critical clusters, the new key using the current key and the set of stored encrypted messages according to the same key generation scheme, when message transmission and reception is repeated a preset number of times through the step (c).

Meanwhile, there is provided a computer-readable recording medium having recorded thereon a program for enabling a computer to perform the communication method using a security key as described above.

To solve the above-described technical problem, a sender node that performs communication via a network or a bus according to an embodiment of the present disclosure includes a nonvolatile memory to store a key generated to be valid for a preset period and an encrypted message, a volatile memory having a storage space corresponding to a storage space of the nonvolatile memory, the volatile memory configured to read the key and the encrypted message stored in the nonvolatile memory, perform calculation or store a calculation result in the nonvolatile memory, and a control unit to perform encrypted communication between critical clusters, wherein the control unit selects a primary message shared between the critical clusters, encrypts a message to send using a key generated to be valid for a preset period from the primary message and sends to a receiver node among the critical clusters, stores the primary message for the preset period according to a same key generation scheme as the receiver node to generate a block, and generates and possesses a new key based on the generated block and a currently used key, so that information about a previous message and a previous key is sequentially accumulated in the new key.

In the sender node that performs communication via a network or a bus according to an embodiment, the control unit may generate the message to send using an encrypted message of a previous period stored in the nonvolatile memory and a key pre-stored to be valid for a current period.

In the sender node that performs communication via a network or a bus according to an embodiment, the control unit may encrypt the message to send and an encrypted message of a previous period using a key pre-stored to be valid for a current period to generate a new encrypted message, and attach the generated new encrypted message to the message to send and send to the receiver node. Additionally, the control unit may read, from the volatile memory, an initial key and an encrypted message pre-stored in the nonvolatile memory at an initial wakeup time of the critical clusters or a key and an encrypted message stored last in the nonvolatile memory from the volatile memory at a previous termination time, to verify match between the critical clusters.

In the sender node that performs communication via a network or a bus according to an embodiment, the control unit may generate and possess the new key using the current key and the set of encrypted messages stored in the volatile memory according to the same key generation scheme as the receiver node, when message transmission is repeated a preset number of times.

To solve the above-described technical problem, a receiver node that performs communication via a network or a bus according to an embodiment of the present disclosure includes a nonvolatile memory to store a key generated to be valid for a preset period and an encrypted message, a volatile memory having a storage space corresponding to a storage space of the nonvolatile memory, the volatile memory configured to read the key and the encrypted message stored in the nonvolatile memory, perform calculation or store a calculation result in the nonvolatile memory, and a control unit to perform encrypted communication between critical clusters, wherein the control unit selects a primary message shared between the critical clusters, receives an encrypted message from a sender node among the critical clusters using a key generated to be valid for a preset period from the primary message, stores the primary message for the preset period according to a same key generation scheme as the sender node to generate a block, and generates and possesses a new key based on the generated block and a currently used key, so that information about a previous message and a previous key is sequentially accumulated in the new key.

In the receiver node that performs communication via a network or a bus according to an embodiment, the control unit may encrypt a message the sender node intends to send and an encrypted message of a previous period using a key pre-stored to be valid for a current period to generate a new encrypted message, receive a message having the generated new encrypted message attached thereto from the sender node, and verify the received message using the encrypted message of the previous period stored in the nonvolatile memory and the key pre-stored to be valid for the current period. Additionally, the control unit may encrypt the received message and the encrypted message of the previous period using the key to be valid for the current period stored in the volatile memory, and compare with the new encrypted message received from the sender node to verify security. Further, the control unit may read, from the volatile memory, an initial key and an encrypted message pre-stored in the nonvolatile memory at an initial wakeup time of the critical clusters or a key and an encrypted message stored last in the nonvolatile memory from the volatile memory at a previous termination time to verify match between the critical clusters.

In the receiver node that performs communication via a network or a bus according to an embodiment, the control unit may generate and possess the new key using the current key and the set of encrypted messages stored in the volatile memory according to the same key generation scheme as the sender node, when message reception is repeated a preset number of times.

Advantageous Effects

The embodiments of the present disclosure dynamically generate a key using a message transmitted and received via a network, such that the transmitted and received messages are piled up in each node for a predetermined period of time to generate a block, and a key continually connected like a blockchain is generated based on the generated block and a key generated in the previous step, to make it difficult for hackers to figure out the corresponding key, and easily and effectively prevent rogue key attacks, replay attack and spoofing attacks as well as significantly reduce overheads spent in authentication, thereby guaranteeing real-time.

BEST MODE

Prior to the description of embodiments of the present disclosure, a review of security issues in the technology of a network within system and problems of the related art associated with an encryption key between nodes constituting the network, and then an introduction to technical means adopted by the embodiments of the present disclosure to solve these problems will be described below.

Figure 1:
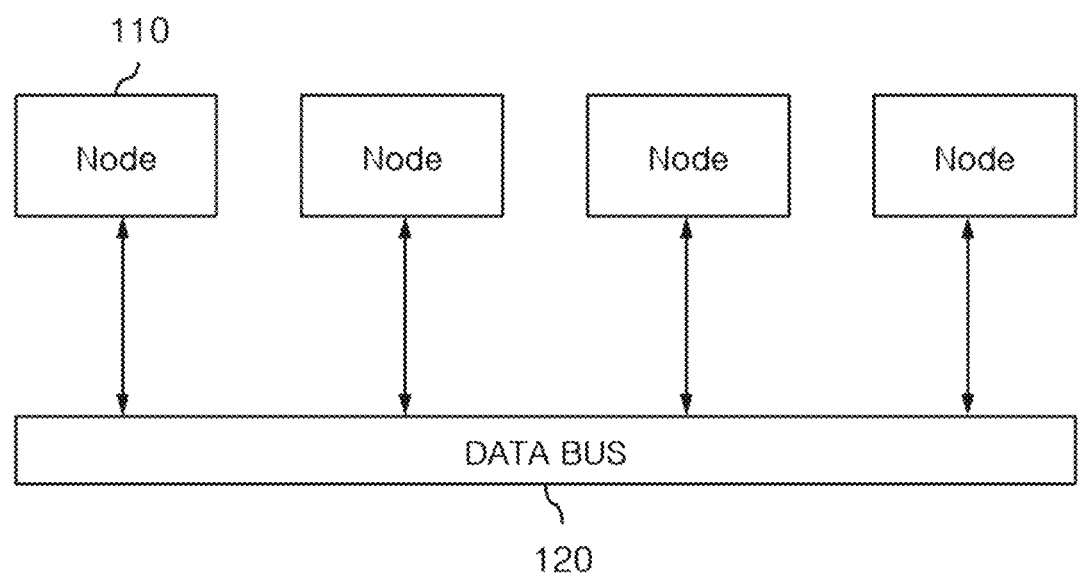
FIG. 1 is a block diagram showing the architecture of a network within system.

FIG. 1 is a block diagram showing the architecture of the network within system, including multiple nodes 110 and a data bus 120 to connect the nodes 110. As briefly described above, many studies have been made on authentication of messages received via the bus 120, but message authentication generally degrades the network performance. Since each node 110 is a real-time system that transmits and receives messages within a promised time, it is necessary to consider overheads in message authentication at the same time.

Many studies have been made to filter out messages sent by unauthenticated nodes, and these studies focus on authentication based on a symmetric key to reduce overheads in message authentication. The symmetric key based studies may be classified into studies using a fixed symmetric key and studies involving dynamic generation of a symmetric key which is shared between each node.

The fixed symmetric key based studies use a fixed key, and when a key is exposed through an insider, it may be a serious security threat, and even though a key is not known, it is vulnerable to replay attacks in which a message is intercepted in a network and re-transmitted. To overcome these limitations, there are improvements to allow nodes to generate a dynamically generated key and share the key or a seed value for key generation via a network. However, these approaches are vulnerable to spoofing attacks in which information is stolen through network surveillance due to the exposure of the key or the seed value for key generation to the network. Additionally, since information is shared via the network, performance overheads may occur, which slows down the entire network.

In the real-time system, for message authentication, a Message Authentication Code (MAC) may be attached to a message to send in consideration of efficiency. In MAC, the sender encrypts and generates a message to send using a key shared between the sender and the receiver, and the receiver decrypts the MAC using the shared key and checks if the decrypted message and the received message match. When the decrypted message and the received message do not match, the message is considered illegitimate. To authenticate the message using the MAC, the sender and the receiver need to share the same key, and the key sharing method may be largely classified into ① a method in which a key is fixed at the time of development and shared between the receiver node and the sender node, and ② a method in which the sender node dynamically generates a key and shares the key with the receiver node via the network.

Figure 2:
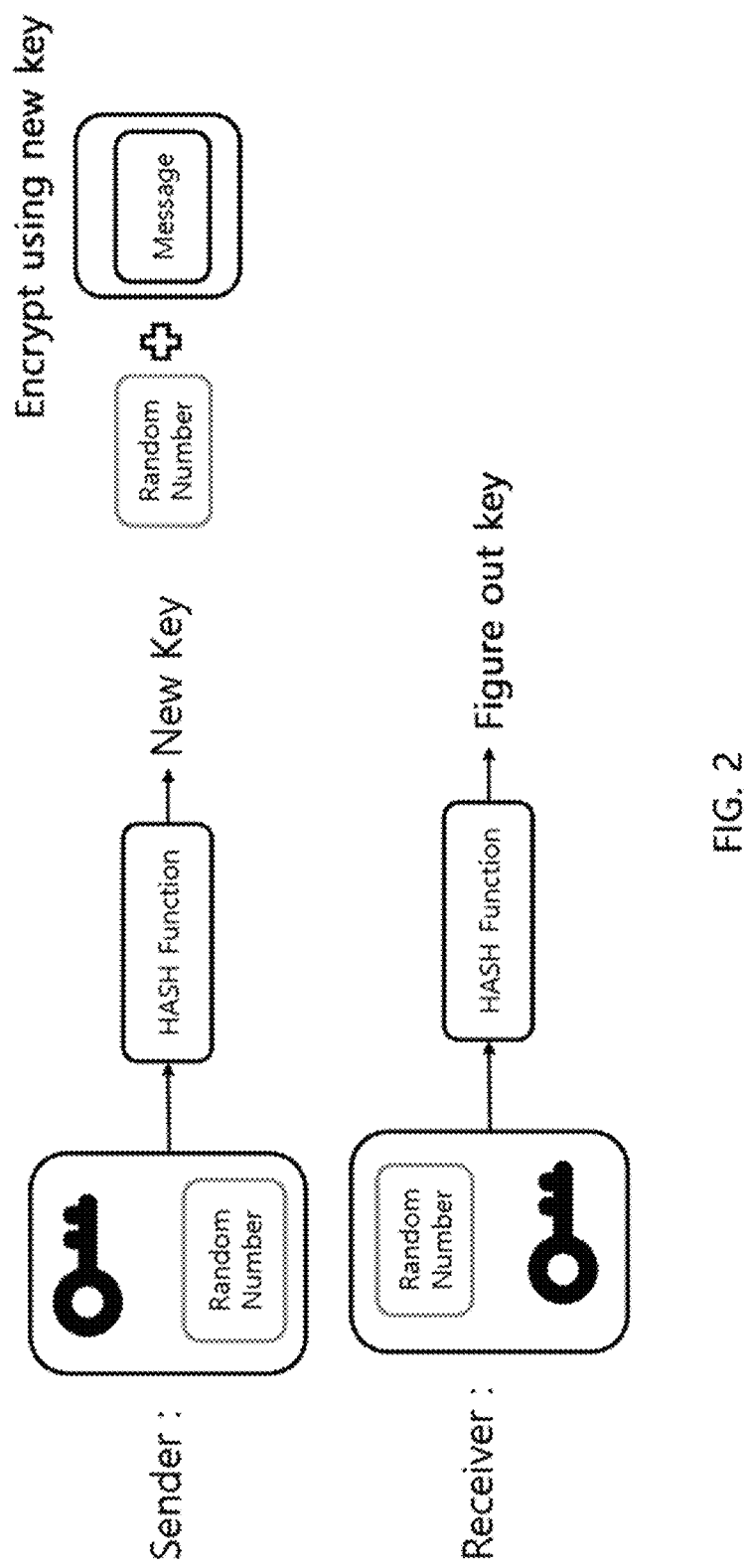
FIG. 2 is a diagram illustrating an example of dynamically generating a key in a network within system.

FIG. 2 is a diagram illustrating an example of dynamically generating a key in the network within system, and there is an introduction to Symmetric Session Encryption Key Exchange using a session key among symmetric key based technologies for security of the network within system.

The method illustrated in FIG. 2 generates a key using a hash function and a random algorithm. Each node shares a secret key, and a node to send a message generates a new number through the random algorithm. After generating the new number, the sender hashes its secret key and number together through the hash function. The hashed result becomes a new session key, and encryption is performed, for example, through an Advanced Encryption Standard (AES) algorithm. Subsequently, the encrypted message and the generated random number are sent together, and the receiver that receives the message checks if the corresponding message is a message from a legitimate node through the received number and the secret key that the receiver has.

However, when the technique using the session key illustrated in FIG. 2 is used, the performance degrades as much as the hash function and the random algorithm are performed. Additionally, encryption is not performed directly using the secret key, but since the secret key does not change, if the key is exposed for a reason, the system security may reduce.

In summary, earlier technologies for security of the network within system employed a method using a fixed symmetric key or a method of dynamically generating a symmetric key. To overcome the limitations of replay attacks or key leakage, the method of dynamically generating a key is adopted but it is vulnerable to spoofing attacks since the dynamically generated key or a seed value for key generation is shared via the network.

Accordingly, the embodiments of the present disclosure described as below propose a security key generation technology in which each of system nodes dynamically generates the same key in an independent way using a specific message itself as a seed value. This proposes a communication method guaranteeing real-time while preventing the exposure of not only a message to send but also a generated key or a seed value for key generation to the network. To this end, the secure communication method proposed by the embodiments of the present disclosure selects nodes to be protected from attackers, selects a message having the closest relation with the corresponding nodes, and dynamically generates a key based on the message, and thus it is impossible to predict the order of messages, thereby increasing the confidentialness of the key. Additionally, each node has a common message and key, and thus can have the same dynamic key without exposure of the key to the network. From the perspective of implementation, the embodiments of the present disclosure partially adopt the structure of the blockchain algorithm.

Figure 3:
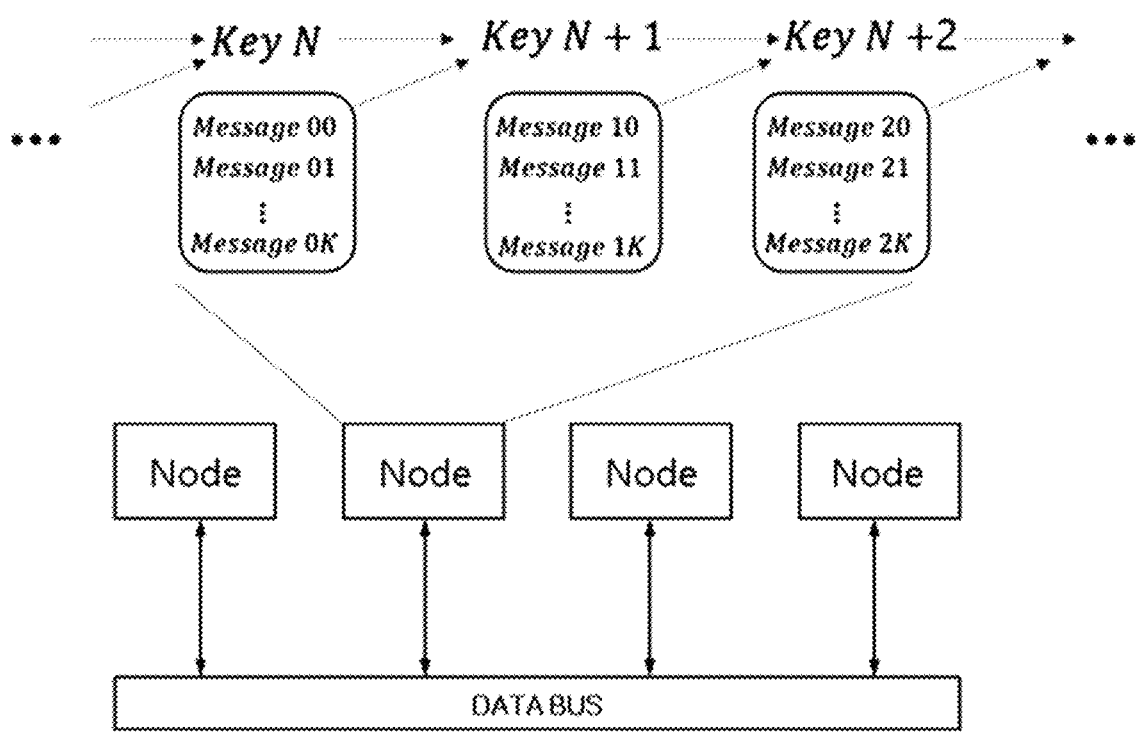
FIG. 3 is a diagram illustrating an idea to generate an authentication key using blockchain adopted by embodiments of the present disclosure.

FIG. 3 is a diagram illustrating an idea to generate an authentication key using blockchain adopted by embodiments of the present disclosure.

Bitcoin invented by Satoshi Nakamoto in 2008 is a cryptocurrency that can be digitally traded in a distributed environment without a trusted authority or a server. The core technology for bitcoin is peer-to-peer (P2P), Public Key Infrastructure (PKI), a distributed consensus process, etc. However, a blockchain is used to ensure the reliability of each transaction, and is technology that prevents the forgery of the previous transaction history by connecting each transaction history like a chain. That is, transaction histories form a structure called a block and contain sequences of transactions to make it impossible to change the current history without changing the past history. Additionally, in the issued bitcoin, coins are linked to each other, thereby avoiding the creation of unauthentic coins. Additionally, bitcoin is characterized in that each node decides its data. That is, it is a system that maintains data considered authentic on the belief on its own decision, not anybody's decision. Through this, it is possible to recover data even if modification occurs. That is, blockchain is said to be a structure for reliable transaction between unreliable nodes in a P2P environment.

In view of the fact that transaction histories form a block in the same way as bitcoin based on blockchain, a mechanism is proposed in which each message history about a network within system generates a new key. That is, instead of a block (a distributed ledger), a key is generated. In the case of blockchain, a new block is generated based on information (a hash value) about the previous block to provide connectivity between blocks, and legitimately generated blocks have uniform connectivity from the first block to the latest block.

Referring to FIG. 3, the embodiments of the present disclosure are based on a network including nodes that operate without a centralized administrator in a distributed environment. Nodes selected to be protected as described below among all nodes keep the same data (a block including a system control message and an authentication key). A new encryption key is generated based on information about the previous messages and the previous key to provide connectivity between newly generated authentication keys. That is, a legitimately generated key has connectivity between message histories from the system operation start to the key generation time. Accordingly, to figure out the authentication key or forge the message, it is necessary to know all messages and keys from the system operation start to the current time, and under this structure, it is possible to ensure security and confidentialness.

Hereinafter, the embodiments of present disclosure will be described in detail with reference to the accompanying drawings. However, in the following description and the accompanying drawings, a detailed description of known functions or elements that may render the key subject matter of the present disclosure ambiguous is omitted herein. In addition, the term 'comprises' when used in this specification, specifies the presence of stated elements, but does not preclude the presence or addition of one or more other elements unless the context clearly indicates otherwise.

The terminology used herein is for the purpose of describing particular embodiments only and is not intended to be limiting of the present disclosure. As used herein, the singular forms include the plural forms as well, unless the context clearly indicates otherwise. It should be understood that the term "comprises" or "includes" when used in this specification, specifies the presence of stated features, integers, steps, operations, elements, components or groups thereof, but does not preclude the presence or addition of one or more other features, integers, steps, operations, elements, components or groups thereof.

Unless otherwise defined, all terms (including technical and scientific terms) used herein have the same meaning as commonly understood by one of ordinary skill in the art. The terms, such as those defined in commonly used dictionaries, should be interpreted as having a meaning that is consistent with their meaning in the context of the relevant art, and will not be interpreted in an idealized or overly formal sense unless expressly so defined herein.

Meanwhile, from the perspective of implementation, for clarity of description, the embodiments of the present disclosure show that a system node has a nonvolatile memory, for example, Electrically Erasable Programmable Read-Only Memory (EEPROM), and a volatile memory, for example, register.

Figure 4:
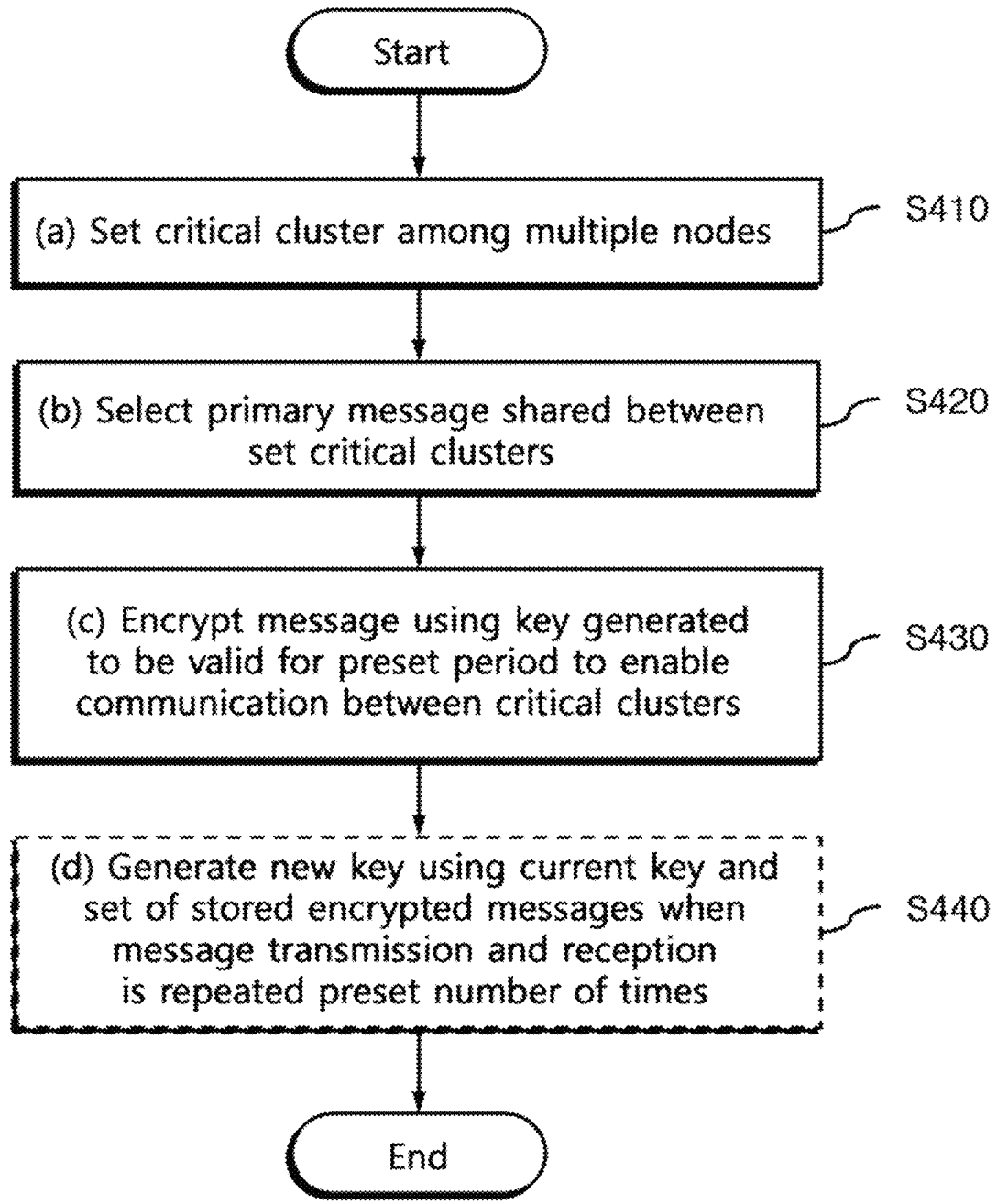
FIG. 4 is a flowchart showing a communication method using a security key between system nodes connected via a network or a bus according to an embodiment of the present disclosure.

FIG. 4 is a flowchart showing a communication method using a security key between nodes connected via a network or a bus according to an embodiment of the present disclosure, and the communication method includes the shown three steps S410, S420, S430, and may further include the step of generating a new key (S440).

In S410, (a) a node to be protected is set among multiple nodes. Here, in the step (a), it is desirable to set, as the node to be protected, a node related to a preset security function among the multiple nodes, a node located within a moving body among the multiple nodes, or a node located within a moving body and a node that interacts with the node. The node to be protected may be referred to (or tagged) as a critical cluster to identify nodes to be protected from attackers and a set of related nodes.

In S420, (b) a primary message shared between the set critical clusters is selected. In the step (b), among a set of messages transmitted and received between the set critical clusters, a message transmitted and received most frequently is selected as the primary message, and when there is a node that does not share the primary message among the critical clusters, it is desirable to transmit the primary message to the corresponding node. That is, the primary message refers to specific messages among the messages transmitted and received between the nodes belonging to the critical clusters.

To select the critical cluster, nodes to be protected from attackers are selected, and messages used much by the nodes are identified. The primary message may be selected among the identified messages. For example, N (N is a natural number) messages are selected as the primary message, and the primary messages are set as a seed for key generation. After selecting the primary message that is a seed for key generation and has the greatest influence on the critical cluster, it is desirable to include, in the critical cluster, other nodes that are not included in the initially set critical cluster, but process the primary messages. In contrast, there may be a node that belongs to the critical cluster but does not transmit and receive the primary message. These nodes need to transmit and receive the primary message to generate a key, and thus it is desirable to force them to transmit and receive the primary message.

There are considerations to be taken in selecting the critical cluster and the primary message. When a large number of primary messages is selected, the key is changed frequently, and frequent key changes lead to high security, but low performance. These tasks may be changed depending on the domain or the purpose of task, and thus the critical cluster and primary message selection task may be preset to satisfy the requirements of the system according to the implementation environment.

After the critical cluster and the primary message are selected, the size of history queue present in the nonvolatile memory is determined. The size of history queue is a factor that determines how many messages are to be accumulated to newly generate a key, and the history queue refers to a queue that stores the message history of the primary message. When the size of history queue is large, the key is changed slowly, but an average message processing rate will increase. On the contrary, when the history queue size is small, the key is changed frequently and security is higher but performance will be lower. It will be necessary to consider the trade-off between security and performance when determining the size of history queue. Accordingly, in the process of setting the size of history queue, it is desirable to set the size of history queue in inverse proportion to the required key update cycle, in proportion to the required message processing rate, and in inverse proportion to the required security level.

In the step S430, (c) a message is encrypted using a key generated to be valid for a preset period to enable communication between the critical clusters. Here, each of the critical clusters stores the primary message for the preset period according to the same key generation scheme to generate a block, and generates and possesses a new key based on the generated block and the currently used key, so that information about the previous message and the previous key is sequentially accumulated in the new key. In the step S430, each of the critical clusters generates a message to send or verifies a received message using the encrypted message of the previous period stored in each of the critical clusters and the key pre-stored to be valid for the current period.

In more detail, a sender node encrypts a message using a key and sends the message, and at this time, a receiver node detects message forgery using a MAC. Additionally, when sending the message, the sender node attaches a previous message to the message, to prevent replay attacks in which the sent message is re-used. The receiver node receives the message, determines the validity of the message using the key that the receiver node has, and checks if the previous message is authentic. When the previous message and the message are determined to be authentic, the receiver node puts the encrypted message in the history queue of the register of each node and processes the message.

In summary, in the step S430, (c2) the message to send and the encrypted message of the previous period are encrypted using the key pre-stored to be valid for the current period to generate a new encrypted message, and (c3) the generated new encrypted message is attached to the message to send, and sent to the receiver node. Further, S430 may further include (c4) encrypting the received message and the encrypted message of the previous period stored in the receiver node using the key valid for the current period stored in the receiver node, and comparing with the received new encrypted message to verify security.

Meanwhile, in the step S430, (c1) the match between the critical clusters may be verified by reading an initial key and an encrypted message pre-stored at the initial wakeup time of the critical clusters or a key and an encrypted message stored last at the previous termination time. Each node needs to have the same history at the time of initial operation of the system. To this end, the histories of each nonvolatile memory are identified using the hash function. During the operation of the system, each storage history and key are hashed through the hash function, and the hash values are compared. When all have the same hash value, the histories stored in the nonvolatile memories are transferred to the volatile memory region and the system starts.

In the step S440, (d) when message transmission and reception is repeated a preset number of times through the step (c) for communication between the critical clusters, each of the critical clusters may generate and possess a new key using the current key and the set of stored encrypted messages according to the same key generation scheme. In more detail, in the step S440, each time message transmission and reception occurs, a preset threshold condition (limitation on the number of times messages are transmitted and received) is inspected, and when message transmission and reception is repeated the number of times corresponding to the threshold condition, each of the critical clusters generates a new key using the current key and the set of stored encrypted messages as a seed according to the same key generation scheme, and the new key may replace the existing key.

From the perspective of implementation, after the message transmission and reception process is performed, messages are gradually accumulated in the history queue. Each time each node transmits and receives a message, each node performs a process of checking the message history queue in the register. When the history queue is full of messages, a new key is generated using the accumulated encrypted messages and the key as a seed value. This process is said to be a process of dynamically generating a key using an unpredictable seed. Through the process of dynamically generating a new key and updating the key, it is impossible to infer the key so long as all the message histories and the size of history queue for key generation are unknown, even if the initial key leaks.

Meanwhile, it may be necessary to perform a post-processing process for a situation (termination of the system) in which the startup of the system (for example, a vehicle or a drone) is turned off, while or after the series of processes of transmitting and receiving a message and updating a key are performed. In case that the wakeup of the system ends, each of the critical clusters compares the current key with the new key generated using the stored encrypted message, and when the match is verified, stores the corresponding key. That is, when the system receives a termination message for stopping the startup during message transmission and reception through the previous process, each node hashes the values in its register through the hash function. Additionally, each node transmits its hash value to the bus to compare with the histories of the other critical clusters. Each node compares the transmitted hash values, and when the hash values match, stores the corresponding values in the nonvolatile memory, and the process ends.

In the communication method of FIG. 4 as described above, each of the nodes accumulates the transmitted and received messages and dynamically generates each key based on the messages. Hereinafter, considerations to be taken in the design step will be described first, and then, the process of the execution step of dynamically generating a key during the operation of nodes based on this will be described in detail.

(1) Design Step

In the embodiments of the present disclosure, each node dynamically generates a key based on messages transmitted and received between them. To this end, in the design step, a critical cluster is selected, and a message to be used to generate a key is selected. It is necessary to consider hardware constraints for key generation.

A message encryption and decryption process is a task with high performance overhead. Accordingly, in terms of performance and cost efficiency, it is efficient to apply this method to only a node for which security attributes are important, such as a node that controls the engine or steering. To this end, in the design step, the engineer needs to select critical clusters to which security is to be applied and select a group. Additionally, a primary message is selected based on messages that the selected critical clusters receive. In addition to the nodes to which security is to be applied as selected by the engineer, the critical cluster includes a node which sends a message to the selected node. For more typical definition, a set of all messages is defined as M={$m_1, m_2, \ldots, m_i$}, a set of all nodes as E={$e_1, e_2, \ldots, e_j$}, and a set of critical clusters selected by the engineer as PE⊂E={$pe_1, pe_2, \ldots, pe_x$}. Furthermore, when a set of messages received by the node $e_j$ is defined as $\overleftarrow{M}_{e_j} \subset M$, a set of nodes that sends the message $m_i$ to the node $e_j$ as $E_{m_i \to e_j} \subset E$ and a set of nodes that receives the message $m_i$ as $\overleftarrow{E}_{m_i} \subset E$, the primary message P may be defined as the following Equation 1.

$$P = \mathrm{argmax}_{m_k \in \overleftarrow{PE}} \left| \overleftarrow{E}_{m_k} \subset PE \right|, \text{ where } \overleftarrow{PE} = \bigcup_{\varepsilon_j \in PE} \overleftarrow{M}_{e_j} \quad \text{[Equation 1]}$$

From the primary message P given through Equation 1, the critical cluster CE may be defined as the following Equation 2.

$$CE = PE \cup E_{P \to e_j \in PE} \quad \text{[Equation 2]}$$

When the primary message and the critical cluster are defined as above, there may be a node that does not receive the primary message P among nodes in the critical cluster. In the algorithm within node, it is necessary to design such that the bus receives the primary message P for the purpose of key generation only, even if it does not use the primary message. This node receives a message used in the algorithm, causing overheads, but a message received most commonly among the messages received by the nodes within PE is defined as the primary message, resulting in minimized overheads.

Figure 5:
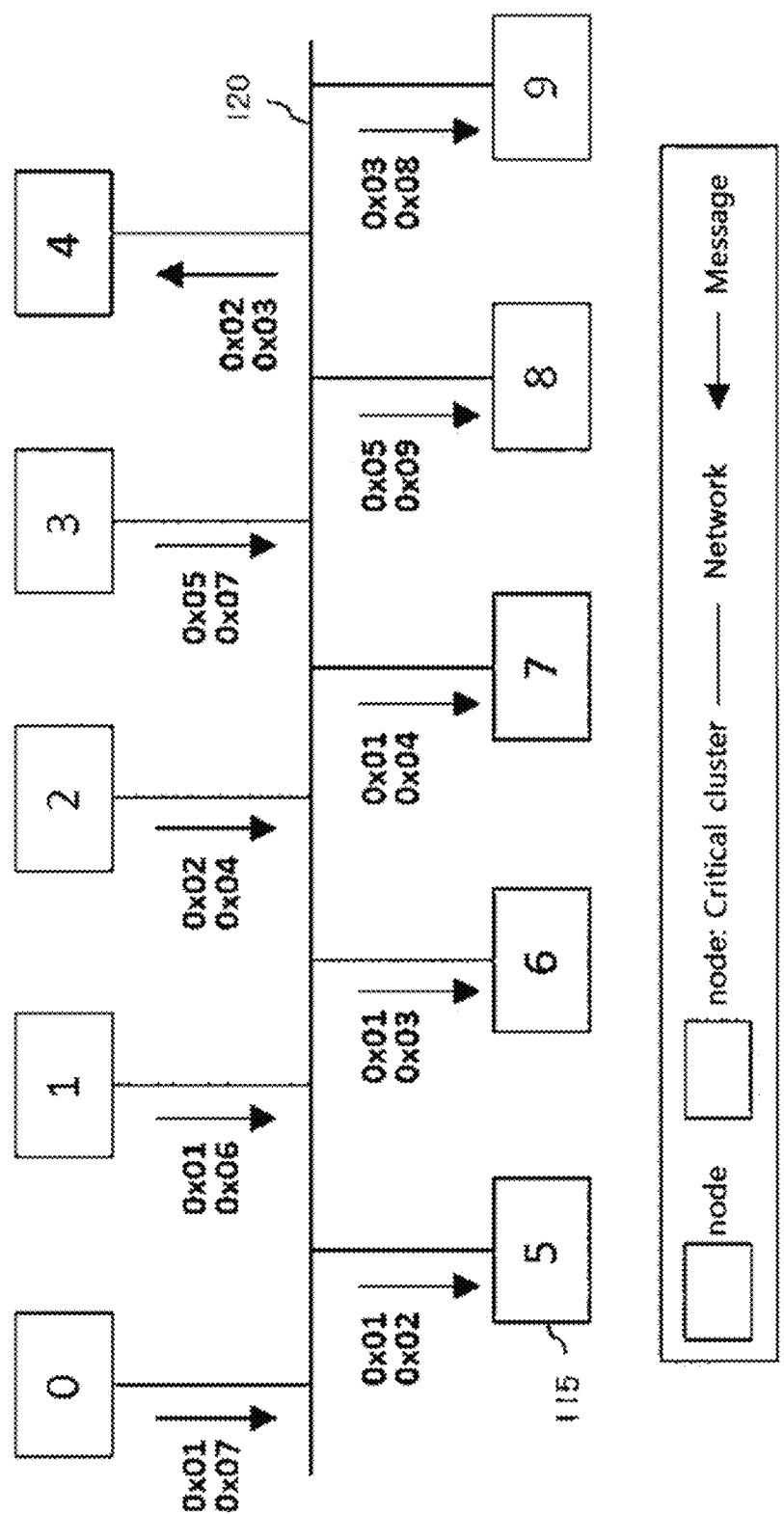
FIG. 5 is a diagram illustrating a process of selecting a critical cluster in the communication method of FIG. 4 according to an embodiment of the present disclosure.

FIG. 5 is a diagram illustrating a process of selecting a critical cluster in the communication method of FIG. 4 according to an embodiment of the present disclosure, and it is assumed that ten nodes connected via the network 120 or bus transmit and receive messages. Additionally, it is assumed that among these nodes, four critical clusters 115 are preset as PE.

Referring to FIG. 5, the sum of messages $\overleftarrow{PE}$ received by nodes #4, 5, 6, 7 to be protected may be defined as {0x01, 0x02, 0x03, 0x04}. Among these messages, '0x01' message is received by a large number of critical clusters, and is select as the primary message P. Additionally, nodes #0, 1, 2 are not a critical cluster that sends a message the critical cluster receives, and eventually, nodes #0, 1, 2, 4, 5, 6, and 7 are selected as the critical cluster. Here, since nodes #2, 4 do not send or receive the '0x01' message selected as the primary message, they are forced to receive the '0x01' message for message authentication.

In addition to selection of the primary message and the critical cluster, it is necessary to consider hardware constraints. As proposed by the embodiments of the present disclosure, to store a block based on messages and manage like a chain to dynamically generate a key, nonvolatile memory (for example, EEPROM) and volatile memory (for example, register) are needed to store the messages and the generated key. The EEPROM and the register need to have a space having the size of 1×τ (τ is the size of the encrypted message) in which a key can be stored and a space having the size of k×τ in which k messages can be stored, respectively. A message through a security module is transmitted to a control unit (for example, may be implemented as a micro control unit (MCU)) into which functions actually performed by the node are implemented. The physical EEPROM and the register may be included in the security module, and where necessary, the security module may be also implemented in the MCU.

(2) Execution Step

The execution step of the secure communication method proposed by the embodiments of the present disclosure starts when the startup of the system turns on, and ends when the startup turns off. A period of time from the turn-on of the startup to the turn-off of the startup is referred to as a cycle. $Cycle_0$ denotes a period of time from the turn-on of the initial startup since the release of the system to the turn-off of the startup.

2.1) Initialization Step

In the initialization step of $Cycle_n$, a key and k encrypted messages stored in the EEPROM are transferred to the register. The data stored in the EEPROM is a value in which a key and k encrypted messages stored in the register in $Cycle_{(n-1)}$ are transferred to the EEPROM. The data in the EEPROM in $Cycle_0$ stores an initial key randomly inserted by the engineer and k messages. In the termination step of $Cycle_{(n-1)}$, data in the register is transferred to the EEPROM after verifying the match of data in the register of the nodes in the critical cluster, making sure that data in EEPROM has the same value in the initialization step of $Cycle_n$.

Figure 6:
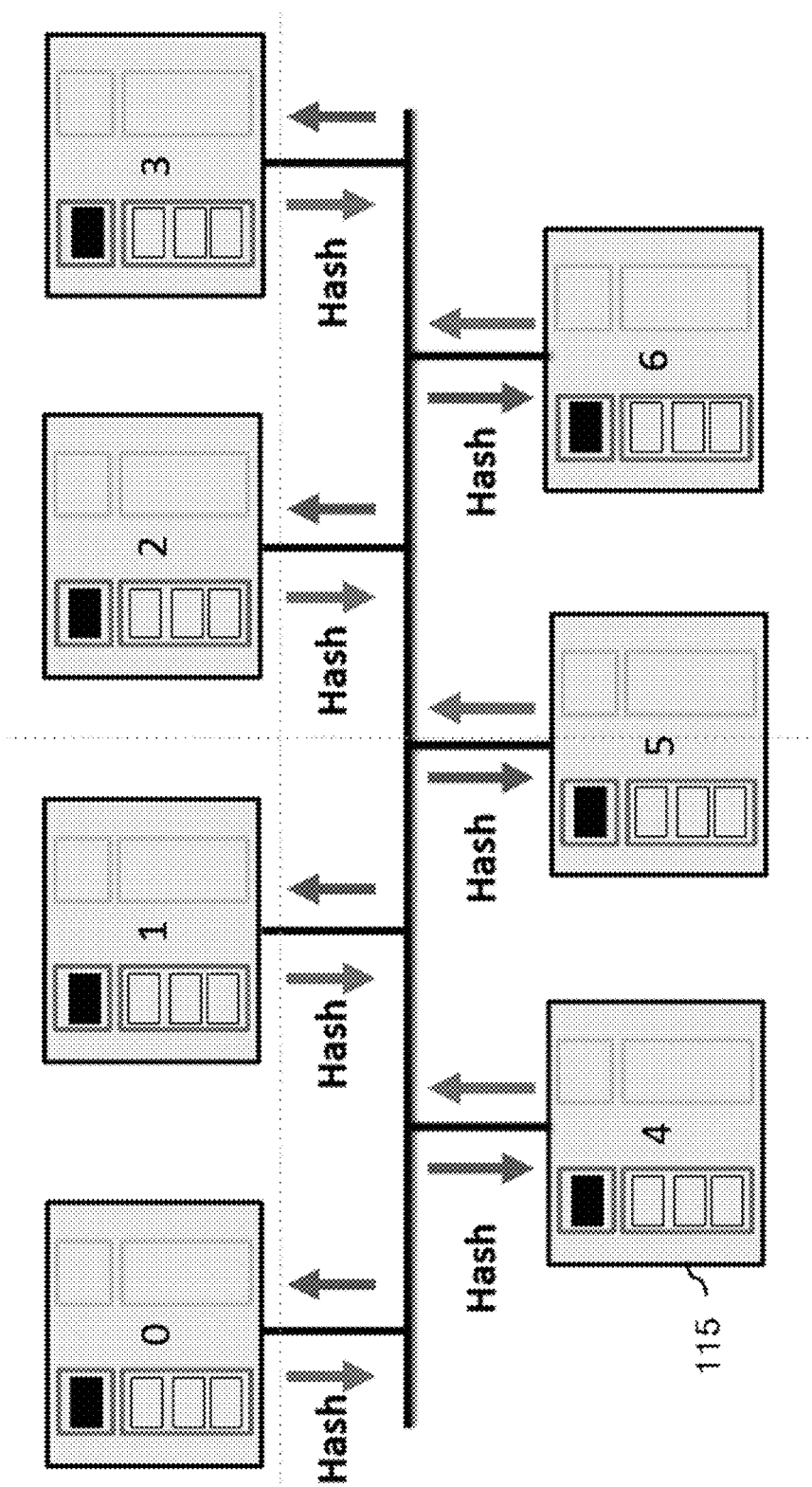
FIG. 6 is a diagram illustrating a process of verifying the match of keys and encrypted messages between critical clusters in the communication method of FIG. 4 according to an embodiment of the present disclosure.

FIG. 6 is a diagram illustrating a process of verifying the match of keys and encrypted messages between critical clusters in the communication method of FIG. 4 according to an embodiment of the present disclosure, showing a process of transmitting a hash value using the key and the encrypted message stored in each critical cluster 115 via the bus and checking if they match.

2.2) Message Transmission and Reception Step

Figure 7:
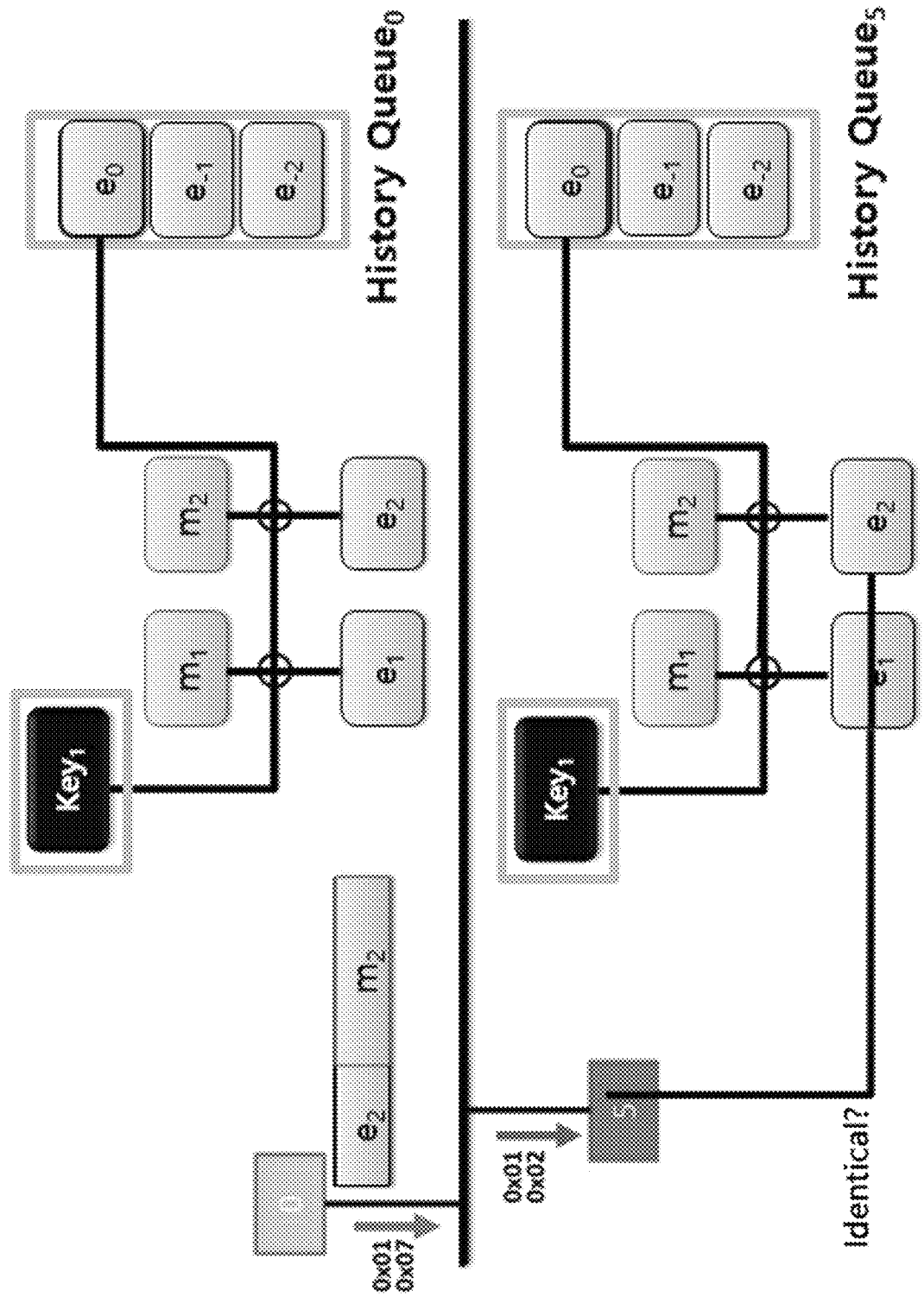
FIG. 7 is a diagram illustrating a process of transmitting and receiving a message using a key in the communication method of FIG. 4 according to an embodiment of the present disclosure.

FIG. 7 is a diagram illustrating a process of transmitting and receiving a message using a key in the communication method of FIG. 4 according to an embodiment of the present disclosure, showing a process in which the receiver node receives a message encrypted through the sender node and verifies it.

First, when all data in the EPROM is transferred to the register, nodes are place in such a state that they can transmit and receive a message. To encrypt and send a message, the sender node encrypts the message to send and the encrypted message stored on the topmost of the register using the key stored in the register to generate an encrypted message MAC. In this instance, a variety of algorithms for encryption such as SHA256 or AES may be selected in consideration of the length of the MAC, and a method of applying each encryption algorithm may make the essence of the present disclosure vague and a detailed description is omitted herein.

To formulate the encrypted message MAC, the $n^{th}$ message to send is defined as $m_n$, and the encrypted message placed on the topmost of the register is defined as $MAC_{(n-1)}$. When the key currently stored in the register is $key_x$ and an arbitrary encryption algorithm is •, the encrypted $MAC_n$ of the message $m_n$ to send may be defined as the following Equation 3.

$$MAC_n = key_x \bullet (m_n, MAC_{n-1}) \qquad \text{[Equation 3]}$$

The sender node generates $MAC_n$ according to the above definition, attaches the generated $MAC_n$ to the message $m_n$ to send, sends the message $m_n$ to the bus, stores the newly generated $MAC_n$ on the topmost of the encrypted message storage of the register, and deletes the bottommost encrypted message.

When the sender node attaches $MAC_n$ to $m_n$ and sends the $m_n$, the receiver node generates $MAC_n'$ of the received $m_n$ using $key_x$ stored in its register and $MAC_{(n-1)}$ stored on the topmost of the encrypted message storage. The generated $MAC_n'$ is compared with the received $MAC_n$, and when the two match, the received message $m_n$ is normally processed, and when the two do not match, it is abnormally processed. When the two match, the receiver node stores the received $MAC_n$ on the topmost of its register and deletes the bottommost MAC to have the same MAC as the MAC storage of the register of the sender. When $MAC_n'$ and $MAC_n$ do not match, a rollback message is transmitted to the bus. When the nodes of the critical cluster receive the rollback message, the key and k MACs stored in the EEPROM are transferred to the register, to perform initialization. This process makes sure that the nodes of the critical cluster always have the same key and the same encrypted message.

The message sender and the message receiver use the encrypted $MAC_{(n-1)}$ of the previous message $m_{(n-1)}$ to generate the encrypted message $MAC_n$ in order to prevent replay attacks in which hackers intercept the previously sent message in the network and re-transmit it. The hackers need to know the current key $key_x$ and the encrypted code $MAC_{(n-1)}$ of the previous message to succeed replay attacks. However, as the encrypted code $MAC_{(n-1)}$ of the previous message is generated based on the encrypted code $MAC_{(n-2)}$ of the previous message, it is necessary to track from the $MAC_0$ to succeed replay attacks, but this signifies tracking from the release of the system (for example, a vehicle or a drone), so it is very difficult.

2.3) Dynamic Key Generation Step

Figure 8:
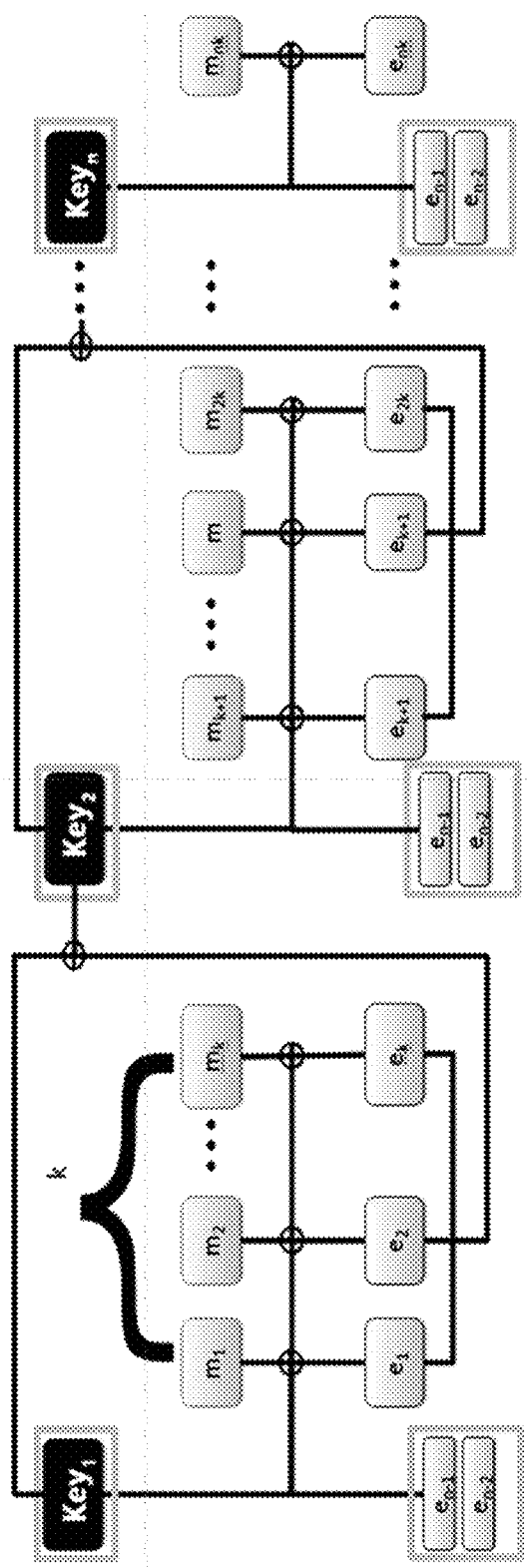
FIG. 8 is a diagram illustrating a process of generating a new key using a history queue in the communication method of FIG. 4 according to an embodiment of the present disclosure.

FIG. 8 is a diagram illustrating a process of generating a new key using a history queue in the communication method of FIG. 4 according to an embodiment of the present disclosure. When the message transmission and reception process is repeated, messages are accumulated in the history queue, and each time message transmission and reception occurs, each node checks the message history queues accumulated in its register, and when the corresponding queue is full, generates a new key using the accumulated encrypted messages and key as a seed value.

That is, when message transmission and reception is repeated a specified number of times k, a new key $key_{(x+1)}$ is generated using the current key $key_x$ and the set of k MACs $SMAC_x = \{MAC_n \ldots MAC_{n+k}\}$ in the register. In the message transmission and reception step, certainly, the registers of all nodes in the critical cluster always have the same key and the same list of MACs, making sure that all nodes in the critical cluster always have the same key. The following Equation 4 typically defines the dynamically generated new key $key_{(x+1)}$.

$$key_{x+1} = key_x \bullet (MAC_n \ldots MAC_{n+k}) \qquad \text{[Equation 4]}$$

After message transmission and reception is performed a specified number of times k using the generated $key_{(x+1)}$ according to the above definition, a new key $key_{(x+2)}$ is dynamically generated. This process is repeated to periodically generate a new key. The values within SMAC stored in the registers of all nodes in the critical cluster always have the same value, making sure that all nodes always generate the same key.

2.4) Termination Step

When a signal for terminating the engine is detected in the network, the critical cluster performs the termination step. In the termination step, the k MACs stored in the register and the current key stored in the register are each transferred to the EEPROM and used in the next cycle. In this instance, to verify that the k MACs in the register-MAC of all nodes in the critical cluster are the same, all nodes in the critical cluster generate a new key by the method of Equation 4, send to the bus and stand by for a preset time t. An arbitrary node $e_n$ in the critical cluster receives n−1 newly generated keys received from a different node via the bus within the preset time t, and checks if the keys match the key newly generated by the node $e_n$. As a result of checking, when all match, the node $e_n$ transfers all the values in its register to the EEPROM. When there is a key that has not been received or does not match, the node $e_n$ transmits a rollback message to the bus, and terminates the process without transferring the values in the register to the EEPROM. When the arbitrary node $e_n$ receives a rollback message for the standby time t before transferring data to the EEPROM, the node $e_n$ terminates the process without transferring the values in the register to the EEPROM. As data in the EEPROMs of all nodes in the critical cluster is used as a key in the next cycle or a seed for key generation, it is necessary to make sure that data in the EEPROMs of all nodes in the critical cluster is always the same. When the time t is set to be too short, a rollback message transmitted by other node may be missed, and thus it is necessary to set the t value to the minimum level of time required by the system or longer.

Figure 9:
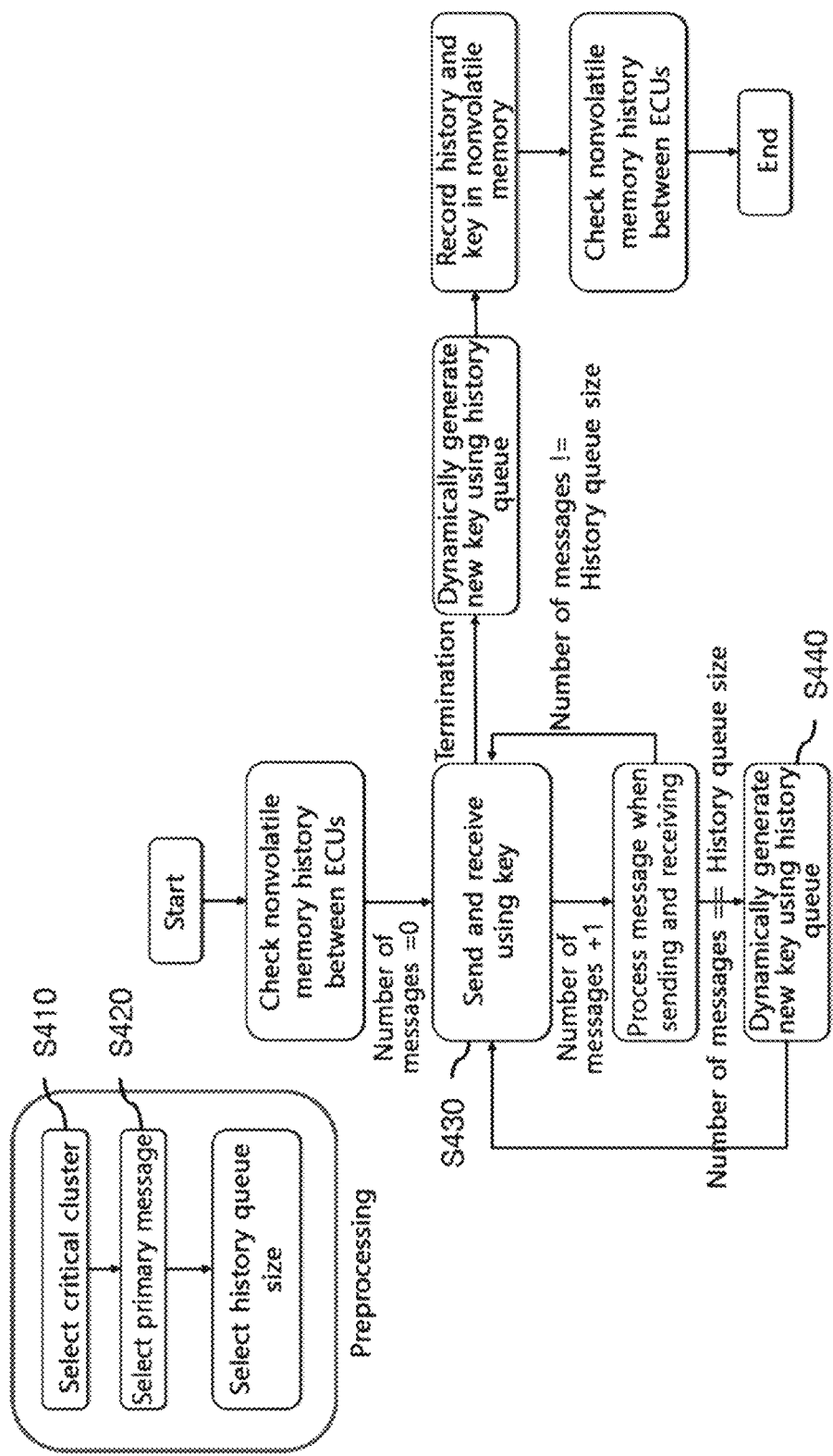
FIGS. 9 and 10 are detailed flowcharts showing an example of the communication method of FIG. 4 using a security key based on blockchain.
Figure 10:
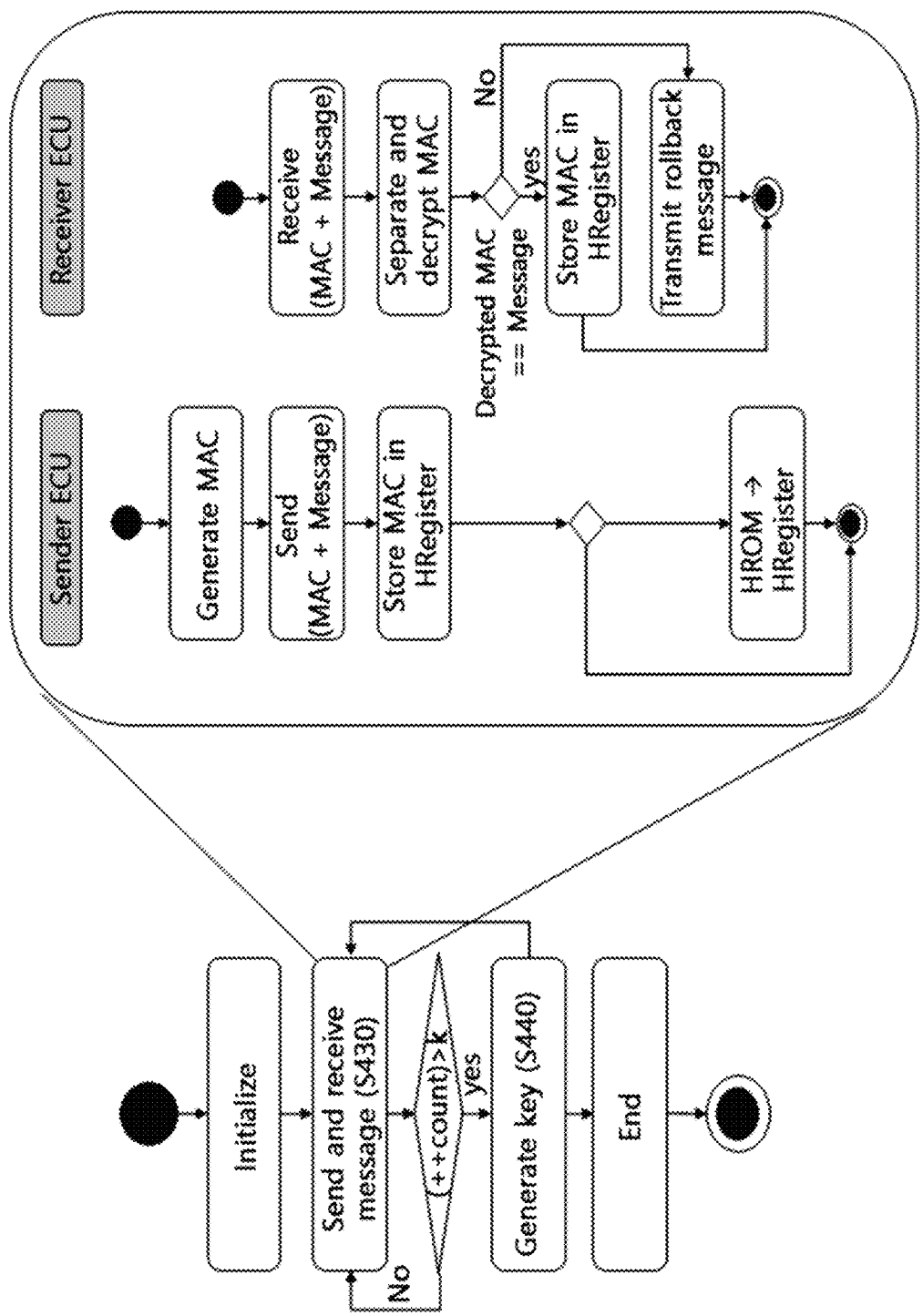

FIGS. 9 and 10 are detailed flowcharts showing an example of communication method of FIG. 4 using a security key based on blockchain.

Referring to FIG. 9, a series of preprocessing processes including selecting a critical cluster (S410), selecting a primary message (S420), and selecting the size of history queue is described. After the preprocessing process is performed, when the nodes start operating, a process of checking nonvolatile memory histories between nodes is performed first. Subsequently, when a transmission and reception process (S430) using a key is repeated, the number of messages increases, and when the increased number of messages reaches the size of the history queue set through preprocessing, a new key is dynamically generated (S440). Meanwhile, when a system termination message is detected, all histories and keys of the critical cluster are recorded in the nonvolatile memory and the system is terminated.

FIG. 10 shows a structure in which the result of the previous cycle affects the current cycle, in particular, specifically showing the message transmission and reception process (S430) on the side of each of the sender node and the receiver node. Referring to FIG. 10, the sender node combines a generated MAC with an encrypted message, sends it to the receiver node, and stores the MAC in the topmost register. Additionally, the receiver node separates the MAC from the received message and decrypts the MAC, and when the decrypted MAC and the encrypted message stored in the receiver node match, stores the MAC in the topmost register, and on the contrary, when the two do not match, transmits a rollback message.

Figure 11:
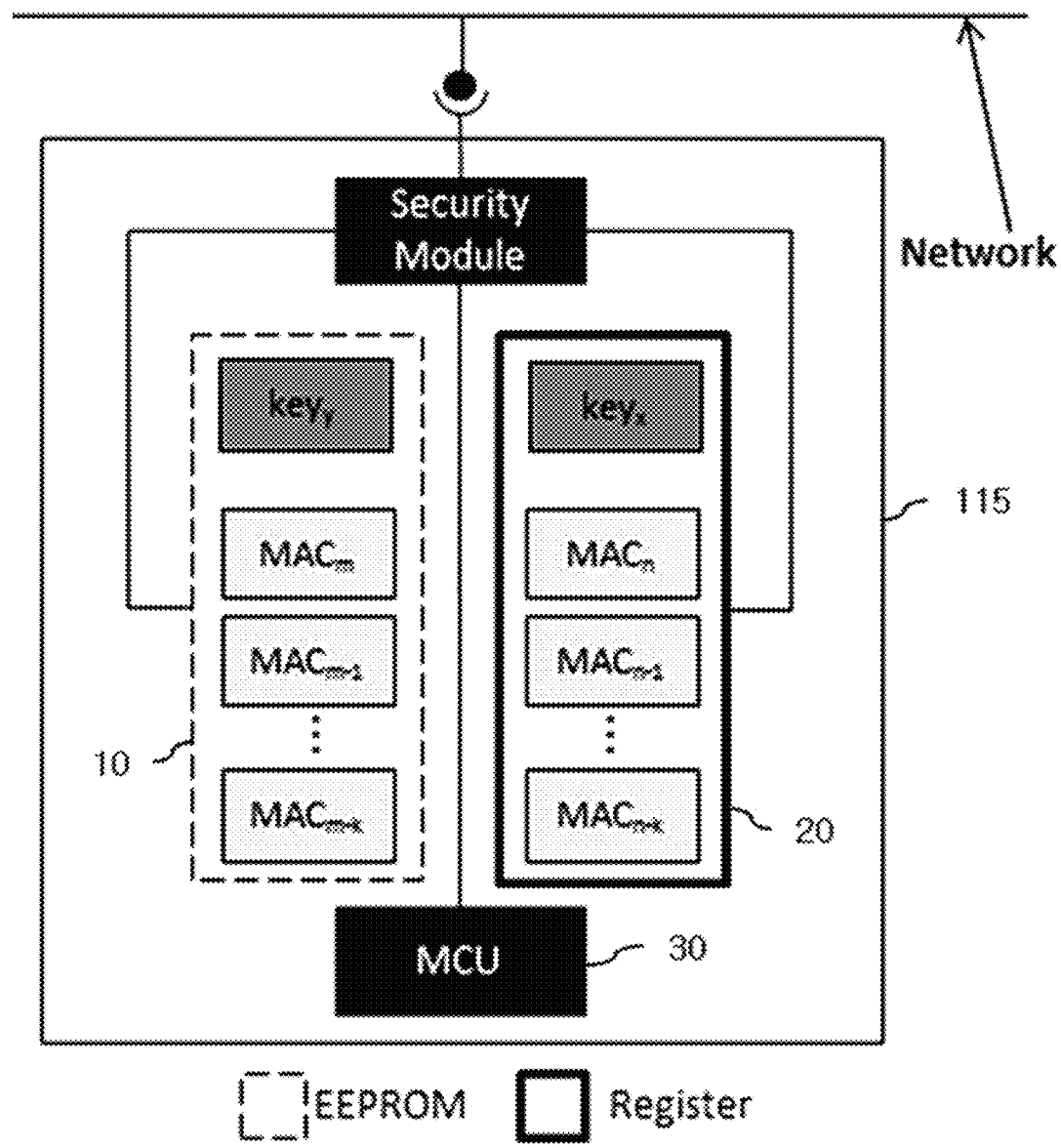
FIG. 11 is a block diagram showing a system node that performs communication via a network or a bus according to an embodiment of the present disclosure.

FIG. 11 is a block diagram showing a node that performs communication via a network or a bus according to an embodiment of the present disclosure. As described previously, in addition to selection of the primary message and the critical cluster, it is necessary to consider hardware constraints, and FIG. 11 shows a logical structure of EEPROM 10 and register 20 in the node. For the system nodes to store blocks based on messages, and manage them like a chain to dynamically generate a key, nonvolatile memory (for example, EEPROM) and volatile memory (for example, register) are needed to store the messages and the generated key. The EEPROM and the register need to have a space having the size of 1×τ (τ is the encrypted message size) to store the key and a space having the size of k×τ to store k messages, respectively. A message through a security module is transmitted to a control unit (for example, may be implemented as a MCU 30) into which functions actually performed by the node are implemented. The physical EEPROM and the register may be included in the security module, and where necessary, the security module may be also implemented in the MCU 30.

The node or critical cluster 115 of FIG. 11 is presented from the perspective of hardware implementation of each process of the communication method using a security key between system nodes as described above through FIG. 4, and to avoid redundant descriptions, the main operations and functions of each component will be described in brief from the perspective of the sender node and the receiver node.

The sender node and the receiver node that perform communication via the network or bus may act as any one of a sender and a receiver according to situations, and have the same basic hardware components.

First, the configuration of the sender node will be described.

The nonvolatile memory (for example, EEPROM) 10 is a means for storing a key generated to be valid for a preset period and an encrypted message.

The volatile memory (for example, register) 20 has a storage space corresponding to a storage space of the nonvolatile memory 10, and is a means for reading the key and the encrypted message stored in the nonvolatile memory 10, performing calculation or storing the calculation result in the nonvolatile memory 10.

The control unit (for example, MCU) 30 is a component that performs encrypted communication between critical clusters, selects a primary message shared between the critical clusters, encrypts a message to send using the key generated to be valid for the preset period from the primary message, sends the message to the receiver node among the critical clusters, stores the primary message for the preset period according to the same key generation scheme as the receiver node to generate a block, and generates and possesses a new key based on the generated block and the currently used key, so that information about the previous message and the previous key is sequentially accumulated in the new key.

The control unit 30 may generate a message to send using the encrypted message of the previous period stored in the nonvolatile memory and the key pre-stored to be valid for the current period.

The control unit 30 may encrypt the message to send and the encrypted message of the previous period using the key pre-stored to be valid for the current period to generate a new encrypted message, attach the generated new encrypted message to the message to send, and send it to the receiver node. Additionally, the control unit 30 may read, from the volatile memory, the initial key and the encrypted message pre-stored in the nonvolatile memory at the initial wakeup time of the critical clusters or the key and the encrypted message stored last in the nonvolatile memory from the volatile memory at the previous termination time, to verify match between the critical clusters.

When message transmission is repeated a preset number of times, the control unit 30 may generate and possess a new key using the current key and the set of encrypted messages stored in the volatile memory according to the same key generation scheme as the receiver node.

Second, the configuration of receiver node will be described.

The nonvolatile memory (for example, EEPROM) 10, the volatile memory (for example, register) 20 and the control unit (for example, MCU) 30 are basically the same as those of the sender node. There is a slight difference from the perspective of the role in operation, but the control unit 30 selects a primary message shared between critical clusters, receives an encrypted message from the sender node among the critical clusters using a key generated to be valid for a preset period from the primary message, stores the primary message for the preset period according to the same key generation scheme as the sender node to generate a block, and generates and possesses a new key based on the generated block and the currently used key, so that information about the previous message and the previous key is sequentially accumulated in the new key.

The control unit 30 may encrypt a message that the sender node intends to send and an encrypted message of the previous period using a key pre-stored to be valid for the current period to generate a new encrypted message, receive a message having the generated new encrypted message attached thereto from the sender node, and verify the received message using the encrypted message of the previous period stored in the nonvolatile memory and the key pre-stored to be valid for the current period. Additionally, the control unit 30 may encrypt the received message and the encrypted message of the previous period using the key valid for the current period stored in the volatile memory, and compare with the new encrypted message received from the sender node to verify security. Further, the control unit 30 may read, from the volatile memory, the initial key and the encrypted message pre-stored in the nonvolatile memory at the initial wakeup time of the critical clusters or the key and the encrypted message stored last in the nonvolatile memory from the volatile memory at the previous termination time, to verify match between the critical clusters.

When message reception is repeated a preset number of times, the control unit 30 may generate and possess a new key using the current key and the set of encrypted messages stored in the volatile memory according to the same key generation scheme as the sender node.

According to the above-described embodiments of the present disclosure, the key is dynamically generated using the message transmitted and received via the network, such that the transmitted and received messages are piled up in each node for a predetermined period of time to generate a block, and a key continually connected like a blockchain is generated based on the generated block and the key generated in the previous step, to make it difficult for hackers to figure out the corresponding key, and easily and effectively prevent rogue key attacks, replay attack and spoofing attacks as well as significantly reduce overheads spent in authentication, thereby guaranteeing real-time.

Meanwhile, the embodiments of the present disclosure may be implemented in computer-readable code in a computer-readable recording medium. The computer-readable recording medium includes all types of recording devices in which data that can be read by a computer system is stored.

Examples of the computer-readable recording medium include ROM, RAM, CD-ROM, magnetic tape, floppy disk, and optical data storage devices. Additionally, the computer-readable recording medium is distributed over computer systems connected via a network, and may store and execute the computer-readable code in a distributed manner. Additionally, a functional program, code and a code segment for implementing the present disclosure will be easily inferred by programmers in the technical field to which the present disclosure belongs.

The present disclosure has been hereinabove described with regard to various embodiments. Those skilled in the art will understand that the present disclosure may be embodied in modified form without departing from the essential features of the present disclosure. Therefore, the disclosed embodiments should be considered in descriptive sense rather than in limiting sense. The scope of the present disclosure is defined in the appended claims rather than the foregoing description, and it should be interpreted that the present disclosure covers all differences within the equivalent scope.

DETAILED DESCRIPTION OF MAIN ELEMENTS

110: Node
120: Network or bus
115: Node to be protected (critical cluster)
10: Nonvolatile memory (EEPROM)
20: Volatile memory (register)
30: Control unit (MCU)

The invention claimed is:

1. A communication method using a security key between nodes connected via a network or a bus, comprising:
    (a) setting a critical cluster among multiple nodes;
    (b) selecting a primary message shared between the set critical clusters; and
    (c) encrypting a message using a key generated to be valid for a preset period to enable communication between the critical clusters,
    wherein each of the critical clusters stores the primary message for the preset period according to a same key generation scheme to generate a block, and generates and possesses a new key based on the generated block and a currently used key, so that information about a previous message and a previous key is sequentially accumulated in the new key, and
    each time each node of the critical cluster transmits and receives a message, each node of the critical cluster checks a message history queue in a register, when the history queue is full of messages, the new key is generated using accumulated messages and the used key as a seed value.

2. The communication method using a security key according to claim 1, wherein the step (a) comprises:
    setting a node related to a preset security function among the multiple nodes as the critical cluster,
    setting a node located within a system among the multiple nodes as the critical cluster, or
    setting a node located within a system and a node that interacts with the node as the critical cluster.

3. The communication method using a security key according to claim 1, wherein the step (b) comprises:
    selecting, as the primary message, a message transmitted and received to/from a largest number of critical clusters among a set of messages transmitted and received between the set critical clusters.

4. The communication method using a security key according to claim 3, wherein the step (b) further comprises:
    sending the primary message to a node that does not share the primary message among the critical clusters, if any.

5. The communication method using a security key according to claim 1, wherein the step (c) comprises:
    generating a message to send or verifying a received message using an encrypted message of a previous period stored in each of the critical clusters and a key pre-stored to be valid for a current period.

6. The communication method using a security key according to claim 1, wherein the step (c) comprises:
    (c2) encrypting a message to send and an encrypted message of a previous period using a key pre-stored to be valid for a current period to generate a new encrypted message; and
    (c3) attaching the generated new encrypted message to the message to send and sending to a receiver node.

7. The communication method using a security key according to claim 6, wherein the step (c) further comprises:
    (c4) encrypting the message received by the receiver node and the stored encrypted message of the previous period using the stored key valid for the current period, and comparing with the received new encrypted message to verify security.

8. The communication method using a security key according to claim 6, wherein the step (c) further comprises:
    (c1) reading an initial key and an encrypted message pre-stored at an initial wakeup time of the critical clusters or a key and an encrypted message stored last at a previous termination time to verify match between the critical clusters.

9. The communication method using a security key according to claim 1, further comprising:
    (d) generating and possessing, by each of the critical clusters, the new key using the current key and the set of stored encrypted messages according to the same key generation scheme, when message transmission and reception is repeated a preset number of times through the step (c).

10. A non-transitory computer-readable recording medium including executable instructions that when executed by a processor cause the processor to perform the method according to claim 1.

11. A sender node that performs communication via a network or a bus, comprising:
    a nonvolatile memory to store a key generated to be valid for a preset period and an encrypted message;
    a volatile memory having a storage space corresponding to a storage space of the nonvolatile memory, the volatile memory configured to read the key and the encrypted message stored in the nonvolatile memory, perform calculation or store a calculation result in the nonvolatile memory; and
    a control unit to perform encrypted communication between critical clusters, wherein
    the control unit is configured to:
        select a primary message shared between the critical clusters, encrypt a message to send using the key generated to be valid for a preset period from the primary message and send to a receiver node among the critical clusters, and store the primary message for the preset period according to a same key generation scheme as the receiver node to generate a block, and generate and possess a new key based on the generated block and a currently used key, so that information about a previous message and a previous key is sequentially accumulated in the new key, and each time the sender node transmits a message, the sender node checks a message history queue in a register, when the history queue is full of messages, the new key is generated using accumulated messages and the used key as a seed value.

12. The sender node according to claim 11, wherein the control unit generates the message to send using an encrypted message of a previous period stored in the nonvolatile memory and a key pre-stored to be valid for a current period.

13. The sender node according to claim 11, wherein the control unit is configured to encrypt the message to send and an encrypted message of a previous period using a key pre-stored to be valid for a current period to generate a new encrypted message, and attach the generated new encrypted message to the message to send and send to the receiver node.

14. The sender node according to claim 13, wherein the control unit reads, from the volatile memory, an initial key and an encrypted message pre-stored in the nonvolatile memory at an initial wakeup time of the critical clusters or a key and an encrypted message stored last in the nonvolatile memory from the volatile memory at a previous termination time, to verify match between the critical clusters.

15. The sender node according to claim 11, wherein the control unit generates and possesses the new key using the current key and the set of encrypted messages stored in the volatile memory according to the same key generation scheme as the receiver node, when message transmission is repeated a preset number of times.

16. A receiver node that performs communication via a network or a bus, comprising:

a nonvolatile memory to store a key generated to be valid for a preset period and an encrypted message;

a volatile memory having a storage space corresponding to a storage space of the nonvolatile memory, the volatile memory configured to read the key and the encrypted message stored in the nonvolatile memory, perform calculation or store a calculation result in the nonvolatile memory; and a control unit to perform encrypted communication between critical clusters, wherein the control unit is configured to:

select a primary message shared between the critical clusters, and receive an encrypted message from a sender node among the critical clusters using the key generated to be valid for a preset period from the primary message, and store the primary message for the preset period according to a same key generation scheme as the sender node to generate a block, and generate and possess a new key based on the generated block and a currently used key, so that information about a previous message and a previous key is sequentially accumulated in the new key, and each time the receiver node receives a message, the receiver node checks a message history queue in a register, when the history queue is full of messages, the new key is generated using accumulated messages and the used key as a seed value.

17. The receiver node according to claim 16, wherein the control unit is configured to encrypt a message to be sent by the sender node and an encrypted message of a previous period using a key pre-stored to be valid for a current period to generate a new encrypted message, and receive a message having the generated new encrypted message attached thereto from the sender node, and verify the received message using the encrypted message of the previous period stored in the nonvolatile memory and the key pre-stored to be valid for the current period.

18. The receiver node according to claim 17, wherein the control unit encrypts the received message and the encrypted message of the previous period using the key to be valid for the current period stored in the volatile memory, and compares with the new encrypted message received from the sender node to verify security.

19. The receiver node according to claim 17, wherein the control unit reads, from the volatile memory, an initial key and an encrypted message pre-stored in the nonvolatile memory at an initial wakeup time of the critical clusters or a key and an encrypted message stored last in the nonvolatile memory from the volatile memory at a previous termination time to verify match between the critical clusters.

20. The receiver node according to claim 16, wherein the control unit generates and possesses the new key using the current key and the set of encrypted messages stored in the volatile memory according to the same key generation scheme as the sender node, when message reception is repeated a preset number of times.

* * * * *